US011307847B1

(12) United States Patent
Yim et al.

(10) Patent No.: US 11,307,847 B1
(45) Date of Patent: Apr. 19, 2022

(54) CONTEXTUAL APPLICATION PROGRAMMING INTERFACES IN A DEVELOPMENT ENVIRONMENT

(71) Applicant: International Business Machines Corporation, Armonk, NY (US)

(72) Inventors: Peter Yim, Raleigh, NC (US); Lakshminarayanan Srinivasan, Cary, NC (US); William Bruce Nicol, II, Durham, NC (US); David De-Hui Chen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/117,609

(22) Filed: Dec. 10, 2020

(51) Int. Cl.
| | |
|---|---|
| *G06F 9/44* | (2018.01) |
| *G06F 8/70* | (2018.01) |
| *G06F 21/10* | (2013.01) |
| *G06F 8/33* | (2018.01) |
| *G06N 20/00* | (2019.01) |
| *G06F 9/54* | (2006.01) |

(52) U.S. Cl.
CPC .............. *G06F 8/70* (2013.01); *G06F 8/33* (2013.01); *G06F 9/547* (2013.01); *G06F 21/105* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,793,359 B1 | 7/2014 | Fiebig | |
| 9,077,773 B2 | 7/2015 | Marietti | |
| 9,323,587 B2 | 4/2016 | Hong | |
| 10,216,812 B2 | 2/2019 | Witkop | |
| 10,360,087 B2 | 7/2019 | Suter | |
| 2005/0015220 A1 | 1/2005 | Ramchandi | |
| 2007/0299825 A1 | 12/2007 | Rush | |
| 2012/0017199 A1* | 1/2012 | Ogura | H04N 1/4406 717/124 |
| 2016/0092897 A1 | 3/2016 | Natarajan | |
| 2017/0371626 A1* | 12/2017 | Abebe | G06Q 10/06313 |
| 2018/0217871 A1 | 8/2018 | Doshi | |
| 2018/0329806 A1* | 11/2018 | Nadig | G06F 11/3672 |
| 2021/0051157 A1* | 2/2021 | Razzaq | H04L 63/08 |
| 2021/0081196 A1* | 3/2021 | Polleri | G06F 16/9035 |
| 2021/0132913 A1* | 5/2021 | Singh | G06F 11/3438 |
| 2021/0303447 A1* | 9/2021 | Haze | G06F 8/33 |

FOREIGN PATENT DOCUMENTS

WO 2015147656 A2 10/2015

* cited by examiner

*Primary Examiner* — Insun Kang
(74) *Attorney, Agent, or Firm* — David B. Woycechowsky (57) ABSTRACT

A computer-implemented process for contextual application programming interfaces in a development environment comprising receiving a user profile data set for use in software development work, formulating a query to locate a set of application programming interface(s) (API(s)) most suited to the software development needs of the software developer; communicating the first query to an API search engine, and receiving a response data set from the API search engine that includes information identifying one or more API(s) most suited to the needs of the software developer.

6 Claims, 4 Drawing Sheets

SCREENSHOT 400

FIRST S/W DEVELOPER ANN, THE TOP THREE (3) APIs TO BEST FIT YOUR S/W DESIGN NEEDS ARE AS FOLLOWS:
 1. WEATHER API BY ABC
 2. SPORTS API BY DEF
 3. GAMING API BY XYZ

FIG. 4

FIG. 5

CONTEXTUAL APPLICATION PROGRAMMING INTERFACES IN A DEVELOPMENT ENVIRONMENT

BACKGROUND

The present invention relates generally to the field of computer software, and more particularly to application specific software applications.

The Wikipedia entry for "development environment" (as of Nov. 17, 2020) states as follows: "In software deployment an environment or tier is a computer system in which a computer program or software component is deployed and executed. In simple cases, such as developing and immediately executing a program on the same machine, there may be a single environment, but in industrial use the development environment (where changes are originally made) and production environment (what end users use) are separated; often with several stages in between. This structured release management process allows phased deployment (rollout), testing, and rollback in case of problems. Environments may vary significantly in size: the development environment is typically an individual developer's workstation, while the production environment may be a network of many geographically distributed machines in data centers, or virtual machines in cloud computing. Code, data, and configuration may be deployed in parallel, and need not connect to the corresponding tier—for example, pre-production code might connect to a production database . . . . Deployment architectures vary significantly, but, broadly, the tiers are bookended by starting at development (DEV) and ending at production (PROD). A common 4-tier architecture is development, testing, model, production (DEV, TEST, MODL, PROD), with software being deployed to each in order."

The Wikipedia entry for "application programming interface" (as of Nov. 17, 2020) states as follows: "An application programming interface (API) is a computing interface that defines interactions between multiple software intermediaries. It defines the kinds of calls or requests that can be made, how to make them, the data formats that should be used, the conventions to follow, etc. It can also provide extension mechanisms so that users can extend existing functionality in various ways and to varying degrees. An API can be entirely custom, specific to a component, or designed based on an industry-standard to ensure interoperability. Through information hiding, APIs enable modular programming, allowing users to use the interface independently of the implementation . . . . In building applications, an API (application programming interface) simplifies programming by abstracting the underlying implementation and only exposing objects or actions the developer needs. While a graphical interface for an email client might provide a user with a button that performs all the steps for fetching and highlighting new emails, an API for file input/output might give the developer a function that copies a file from one location to another without requiring that the developer understand the file system operations occurring behind the scenes." (footnote(s) omitted)

API marketplaces are known. An API marketplace provides a computer accessible platform to API providers for publishing APIs so that developers can discover them. Some API marketplaces permit providers to monetize their APIs. Some API marketplace platforms include "API search engines" so that developers can enter queries and find the best API fit for their respective needs and requirements and/or budget. This kind of "API search engine" is not to be confused with API's that are used to implement a search engine (for example, implement a search engine within the confines of a new website).

It is known to use machine learning (ML) techniques to help revise certain types of queries for search engines. For example, U.S. Patent Application Publication number 2019/0370393 ("Finch") states as follows: "Aspects of subject technology provide systems and methods for simultaneously spell-correcting and completing partial search queries being entered by a user on the user's electronic device. An apparatus such as a computing device may receive partial search queries from the user's electronic device as each character of the partial search query is entered by the user. The apparatus may utilize a machine-learning model to generate suggested queries that include spelling-corrected versions of the received partial query, query completion suggestions for the partial query, and/or spelling-corrected completion suggestions for the partial query."

SUMMARY

According to an aspect of the present invention, there is a method, computer program product and/or system that performs the following operations (not necessarily in the following order): (i) receives, from a first software developer, a first user profile data set, with the first user profile data set including information indicative of historical actions taken by the first software development in the course of the first software developer's software development work; (ii) formulates, by a trained machine learning algorithm, a first query based, at least in part on the first user profile data set, with the first query being a query designed to locate a set of application programming interface(s) (API(s)) most suited to software development needs of the first software developer; (iii) communicates the first query to an API search engine; and (iv) responsive to communicating the first query to an API search engine, receives a response data set from the API search engine, with the response data set including a first set of search result(s) that includes information identifying one or more API(s) most suited to the software development needs of the first software developer.

DETAILED DESCRIPTION

Some embodiments of the present invention are directed to a computer-implemented process for contextual application programming interfaces in a development environment comprising receiving a user profile data set for use in software development work, formulating a query to locate a set of application programming interface(s) (API(s)) most suited to the software development needs of the software developer; communicating the first query to an API search engine, and receiving a response data set from the API search engine that includes information identifying one or more API(s) most suited to the needs of the software developer.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
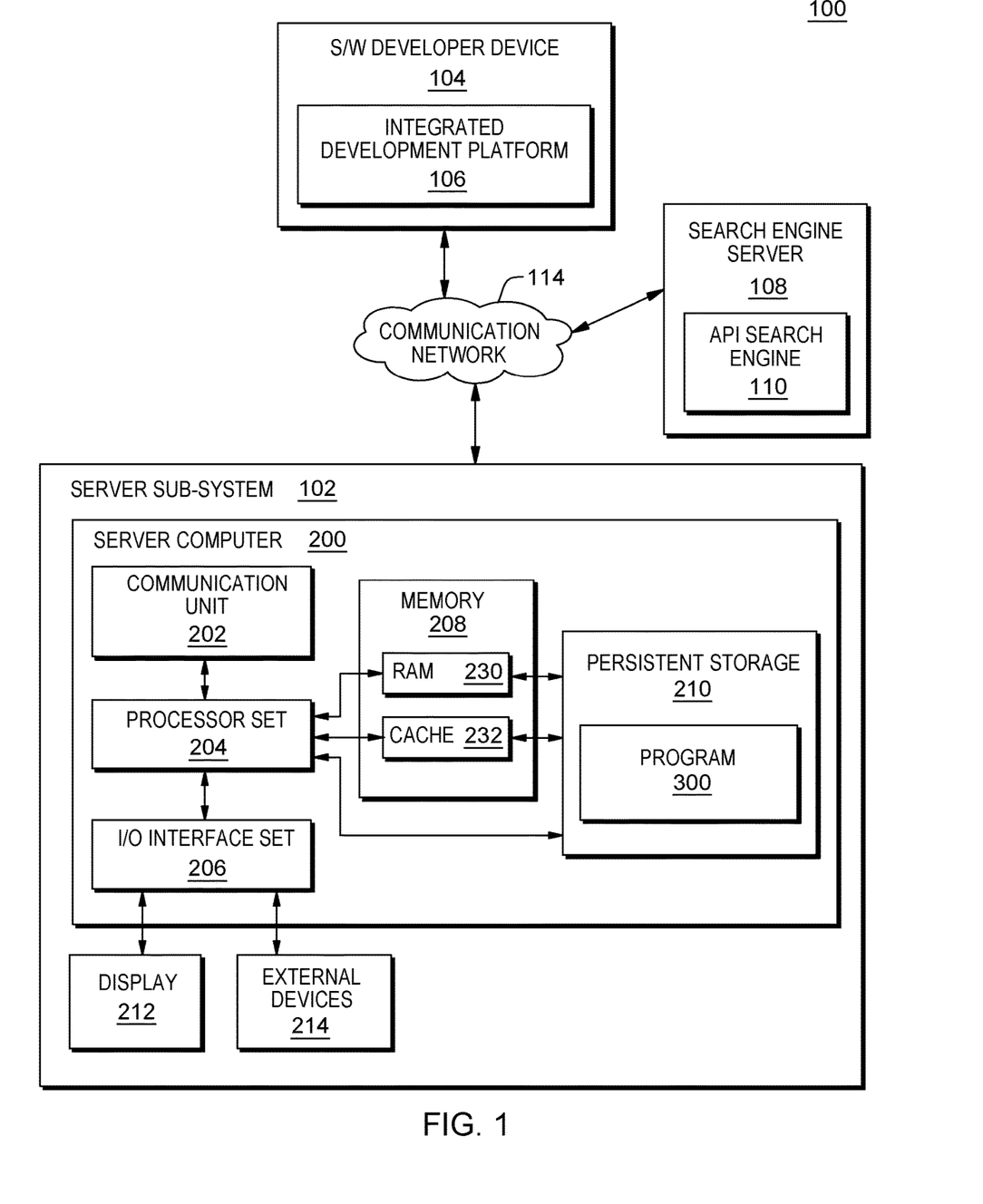
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); software developer device 104; integrated development platform 106; search engine server 108; and API search engine 110; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
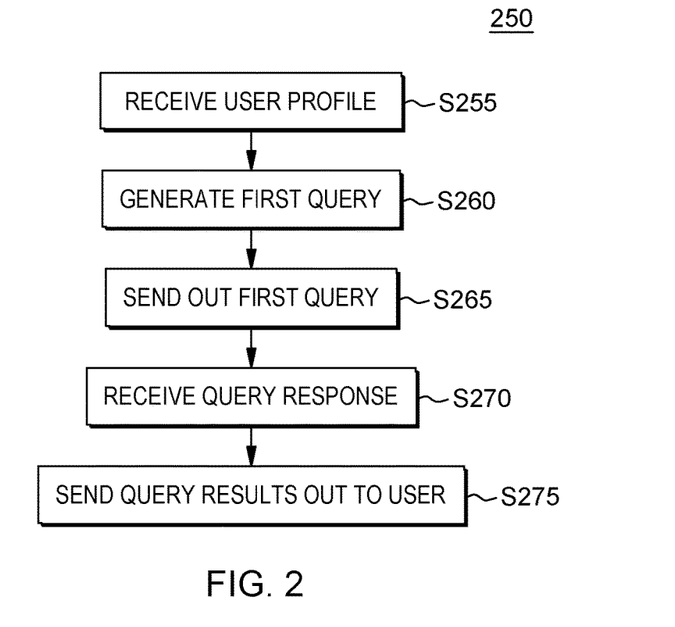
FIG. 2 is a flowchart showing a first embodiment method performed, at least in part, by the first embodiment system.
Figure 3:
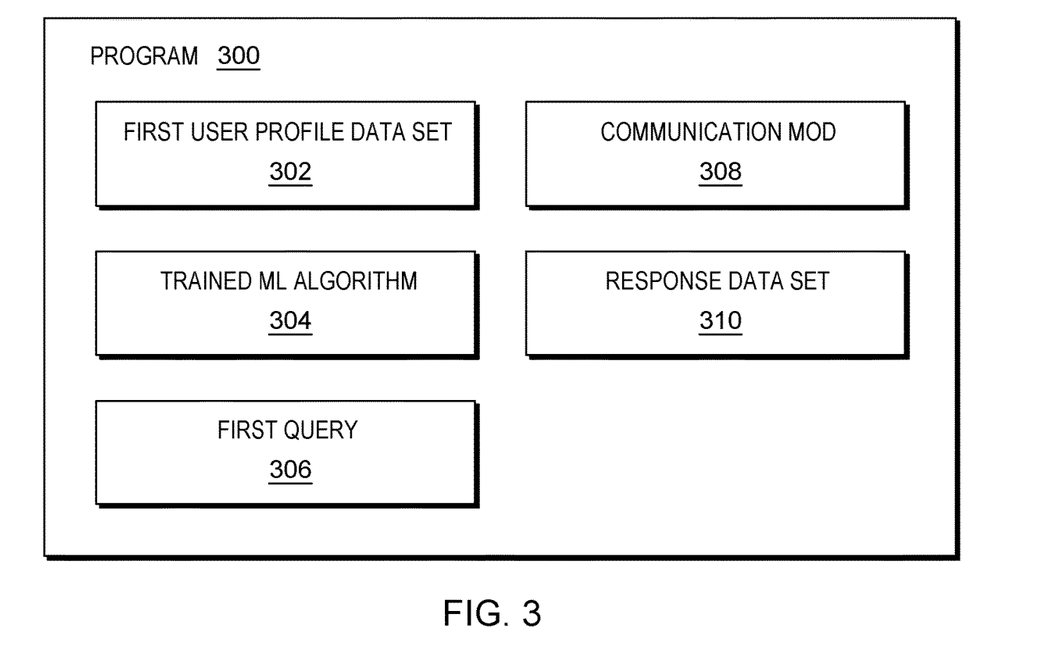
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where first user profile data set 302 is received through communication network 114 and from integrated development platform 106 of software developer device 104. The first user profile corresponds to a first software developer (not shown), who is designing software using integrated development platform 106. The first user profile data set includes information indicative of historical actions taken by the first software development in the course of the first software developer's software development work. In this example, data set 302 includes historical actions having the following action types: snippets, project environment, cursor location, prior history and collaborator's actions.

Processing proceeds to operation S260, where a trained machine learning algorithm 304 generates a first query 306 based, at least in part on first user profile data set 302, with the first query being a query designed to locate a set of application programming interface(s) (API(s)) most suited to the software development needs of the first software developer. This is possible, at least in part because of the training that has been received by trained machine learning algorithm 304. In this example, the training of algorithm 304 includes all of the following types of machine learning type training: supervised, unsupervised and reinforcement.

Processing proceeds to operation S265, where communication module ("mod") 308 communicates first query 306 to API search engine 110 of search engine server 108 through communication network 114. Search engine server 108 is a set of computing device(s) structured and otherwise configured to provide an API marketplace.

Processing proceeds to operation S270, where a response data set 310 is received from API search engine 110 of search engine server 108 through communication network 114. Response data set 310 includes a first set of search result(s) that includes information identifying one or more API(s) most suited to the software development needs of the first software developer.

Figure 4:
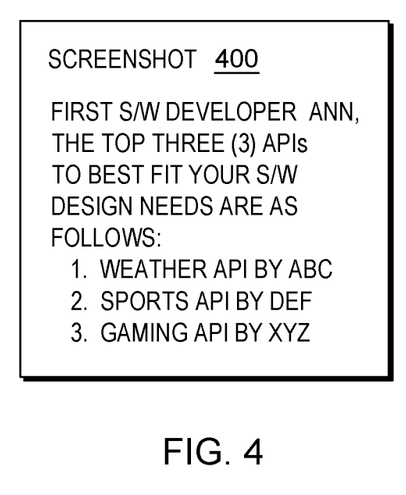
FIG. 4 is a screenshot view generated by the first embodiment system.

Processing proceeds to operation S275, where mod 308 communicates at least a portion of the first set of search result(s) to the first software developer at software developer device 104. This is shown at screenshot 400 of FIG. 4.

III. Further Comments and/or Embodiments

A method according to an embodiment of the present invention for identifying an application programming interface (API) includes the following operations (not necessarily in the following order): (i) receives an indication of the API from a user having a role in a company; (ii) applies a machine learning (ML) artificial intelligence (AI) API selection model trained against the user and the company to the indication of the API to form a search tailored to the API; (iii) performs the search tailored to the API in a plurality of API marketplaces to identify a list of candidates; (iv) analyzes the list of candidates by the ML API selection model to identify an ordered list; (v) presents a selectable top number of candidates from the ordered list to the user; responsive to receiving a selection from the selectable top number of candidates by the user; (vi) automatically provides a reference to the selection of the top number of candidates includes licensing information; (vii) the licensing information provides details are selected from a group consisting of available seats (if already purchased), purchase options, promotions, and upgrade credits; and (viii) responsive to identifying a usage affecting licensing, updates automatically the licensing information. In this embodiment, the indication of the API is in an integrated development environment (IDE).

Some embodiments of the present invention may include one, or more, of the following operations, features, characteristics and/or advantages: (i) deduces what the user's intention is using ML and cues so that search terms can be composed to request a list of APIs for review and purchase; (ii) takes into account and applies user's actions in a client environment (for example, snippets, project environment, cursor location, prior history and collaborator's actions, etc.), where these actions are considered, then fed into ML to come up with search terms for retrieving APIs from the API marketplaces; (iii) focuses on tracking API registration/usage and its purchase history in the context of the user's company API purchase procurement record; (iv) helps employees and their company in tracking purchase and usage history so that proper actions can be performed by the company's procurement department or employees; and/or (v) focuses on the client's experience within an application, like an IDE, so that integration of APIs can be done easily.

Some embodiments of the present invention may include one, or more, of the following operations, features, characteristics and/or advantages: (i) retrieves APIs from a plurality of marketplaces, based on the user's intent in the context of a company, for the intent of purchase and integration (ii) facilitates the purchase of APIs and the integration of them in an application like IDE; (iii) reduces the disconnect between API marketplaces and the purchase/usage of APIs in a company setting, dictated by policies and regulations; (iv) claims the matching list, based on many factors, and relies on the user/purchaser to make the ultimate decision in purchasing and integrating the APIs in his/her environment; (v) focuses on finding client side APIs, purchase history, and usage tracking; (vi) shows records of purchased APIs or APIs that conform to company policies as one factor in the API retrieving process; (vii) shows the user/purchaser the APIs the company has purchased in the past, reducing the chance of duplicate spending, which may get a better rate than individual purchases; (viii) focuses on the clients environment context and user actions to get user's intent for search terms within the API marketplaces; (ix) considers collaborators and user's prior actions and company policies in the API search results; and/or (x) focuses on the development phase and how it facilitates API search, retrieval, purchase, and adoption.

Some embodiments of the present invention recognize the following facts, potential problems and/or potential areas for improvement with respect to the gap between API providers and API consumers: (i) API consumers don't have a simple way, other than doing manual search queries in an API catalog, to view a list of APIs; and/or (ii) API providers can't tailor to the need of the API consumers in the most effective way, other than posting their APIs in a catalog or marketplace.

Some embodiments of the present invention may include one, or more, of the following operations, features, characteristics and/or advantages is to: (i) bring APIs tools which developers use frequently, in a way that reduces problems in selecting, purchasing, and using APIs; (ii) complies with company and license policies; and/or (iii) provides the following values: (a) companies have many products and product APIs and use software platforms for viewing and testing their product APIs, and/or (b) the easier it is to find and view APIs, the more APIs would be purchased, and hence, the satisfaction for the business clients/partners is increased which translates to more revenue for the company.

Some embodiments of the present invention may include one, or more, of the following operations, features, characteristics and/or advantages with respect to an agent (collaborative software or groupware) comprising the following features and capabilities: (i) resides in a place with which developers and/or project contributors most often interact when doing code development; (ii) the agent may also reside on a user's desktop to track project related activities; (iii) recognizes the contributors in the project where the agent is installed in every collaborator's IDE; (iv) performs finding APIs based on criteria; (v) displays results based on criteria; and/or (vi) enables API e-commerce transactions.

Some embodiments of the present invention may include one, or more, of the following operations, features, characteristics and/or advantages: (i) finding APIs in a marketplace or marketplace ecosystem is based on the user's intent; (ii) software is usually built in a collaborative fashion; and/or (iii) consideration of factors that may affect finding APIs include but are not limited to: (a) prior selection or usage of APIs by the developer/co-workers, (b) roles of the developer/co-workers on the project and their prior actions (for example, the accounting manager on the project uses commercially available accounting software), (c) the company's existing third party licensed vendors or contracts, (d) keywords/comments/function names/file name and their deduced semantic variants (use prior arts for variant deduction) of code snippet at the cursor position (very specific), (e) cursor position on significant markers such as ending curly brace or function name, (f) mouse clicks on certain functional icons, (g) selected blocks of code being highlighted, (h) programming language, framework, and libraries are loaded in the project/workspace, and/or (i) the user's familiarity to API models are captured based on explicit (that is, settings) or implicit (that is, machine learning of developer's code development) information.

Some embodiments of the present invention may include one, or more, of the following operations, features, characteristics and/or advantages of API results in IDE: (i) results are ranked by: (a) preferred vendors, (b) company contracts or purchases, and/or (c) promotions through an embodiment which support advertisement in an API marketplace platform; (ii) inclusion based on: (a) preferred vendors selected by the developer's company, (b) the number of available allocations in an existing company-wide purchase agreement and its procurement details (for example, purchase and renewal date) where if all allocations of an API are taken or the contract expires, opt-out of including it in the results, and/or (c) type of license per company guidelines; and/or (iii) exclusion based on: (a) license types the developer's company doesn't accept, (b) vendor reputation, (c) user review, (d) uptime reliability, and/or (e) performance.

Some embodiments of the present invention may include one, or more, of the following operations, features, characteristics and/or advantages pertaining to IDE interaction and commercial transaction experience of interested APIs: (i) includes purchase experience through: (a) upgrade options to obtain the usage of the selected APIs based on prior individual or company-wide purchases, (b) available credits, (c) allocation assignment, and/or (d) one-click purchase; (ii) purchased API usage may be tracked so that: (a) allocation(s) can be relinquished and go back to company allocation pool if business logic changes, and/or (b) expiration and renewal can be sent to the company's procurement or project office so API usage wouldn't be blocked or fail; and/or (iii) once an API selection is made, the API's invocation signature, its variables (global or local), and dependent libraries are auto-filled and auto-inserted into the project space.

Figure 5:
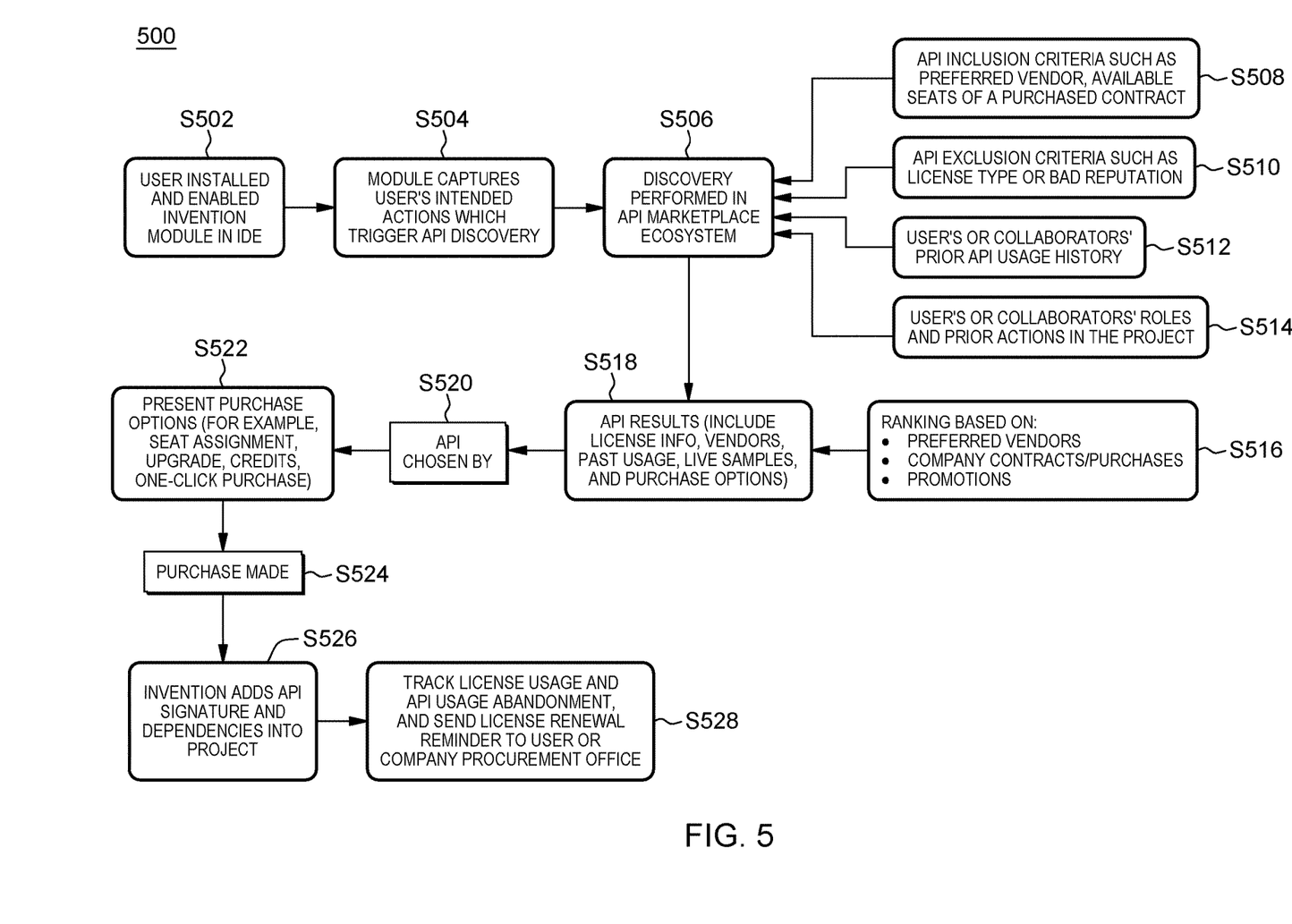
FIG. 5 is a block diagram according to an embodiment of the present invention.

As shown in FIG. 5, diagram 500 includes: user installed and enabled invention module in IDE block S502; module captures user's intended actions which trigger API discovery block S504; discovery performed in API marketing ecosystem block S506; API inclusion criteria such as preferred vendor, available seats of a purchased contract block S508; API exclusion criteria such as license type or bad reputation block S510; user's or collaborators' prior API usage history block S512; user's or collaborators' roles and prior actions in the project block S514; ranking based on preferred vendors, company contracts/purchases, promotions block S516; API results (include license info, vendors, past usage, live samples, and purchase options) block S518; API chosen by block S520; present purchase options (for example, seat assignment, upgrade, credits, one-click purchase) block S522; purchase made block S524; invention adds API signature and dependencies into project block S526; and track license usage and API usage abandonment, and send license renewal reminder to user or company procurement office block S528.

In some embodiments of the present invention, the following example paragraphs describe User Case #1 and User Case #2 utilizing embodiments of the present invention.

User Case #1: Collaborative Software Development

User A is a developer in an e-commerce platform company. He works as part of a large project to build a shopping-cart experience for a big client with his/her colleagues. He has the project source code checked out and loaded into the IDE. His/her responsibility is to write a line chart routine to visually display price history for the merchandise. The agent for the novel system understands that the project is about building an ecommerce experience (context). The system recognized that: (i) user A is in an area that deals with front-end in a model-view-controller framework (context); and/or (ii) user A created a stub function block named: convert_to_line_chart_based_on_price_history( ){ } (specific).

When user A's cursor stopped at the function name, the system agent decided it has enough information to perform finding an API in an API marketplace ecosystem service, which has information about user A's company's existing API licenses, his/her colleagues' prior API usage, and company-compliant license types.

The system presents the results as an in-IDE pop-up dialog (other UI (user interface) such as a tab view, which should be covered within the system) with API license information, API sample source information, and live demo information to immediately allow user A to select an API for his/her work. The result is user A has now: (i) selected an API with an invocation signature; (ii) stubbed the API into the code with imported statement and file dependencies; and/or (iii) the transaction of the API usage/license is tracked.

Use Case #2: Software Development by Freelancer

A non-profit Helping Hand organization runs various fund-raising events. Its staff, user A, and accounting manager, uses accounting program X. User B, a voluntarily backend developer, uses programming language P to support organizational needs in his/her free time. Volunteer Org1 wants to build a fundraising campaign for building a shelter which can be used by homeless people in a large city. Because this is a marquee project for Volunteer Org1, they try to use professional help and hire a freelance software expert, user C, who typically happens to use IDE to build this project.

Using embodiments of the present invention: (i) user C created a simple web landing page with information related to fundraising and pledges for a shelter in a large city for Volunteer Org1; (ii) based on the domain volunteerorg1.org, the system agent pulls historical information about the activities and technology stack on this domain; (iii) the agent detects the organization using programming language P on the backend and accounting program X for accounting; (iv) the agent automatically connects the dots (information gleaned from above) and proposes scaffolding code and API recommendations to complete this project successfully including: (a) recognizing the need to have the API integrated within the accounting program X accounting system, (b) recognizing the need to allow contributions to be accepted, (c) proposing nurture APIs and email integration within the campaign, (d) allows social login to be captured and to register users pledging or contributing to the campaign, (e) utilizes software as a service (SaaS) in the software application, and/or (f) integrates with neighborhood based social APIs to reach the right contribution target; (v) user C chooses a recommended API; and/or (vi) commerce experience based on the system described above will follow: (a) purchase options, such as available allocations or licenses, are presented to user C, (b) the purchase selection(s) made, (c) the usage of the API, and/or (d) the number of allocations deployed.

On the other hand, under currently conventional technology, user C will have to build the scaffolding all by himself manually.

Some embodiments of the present invention may include one, or more, of the following operations, features, characteristics and/or advantages: (i) focuses on finding APIs in an API marketplace ecosystem, not source code repositories; (ii) depicts a commerce transaction of APIs such as purchase options (allocation assignments, upgrade) and permission of use based on license type; (iii) focuses on an integration journey of browsing, purchasing, and adopting APIs; and/or (iv) is not about API pricing.

Some embodiments of the present invention may include a system and method of presenting and brokering contextual APIs for exploration based on the information gleaned by a collaborative agent residing in a development environment (that is, integrated development environment (IDE) or desktop client).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving, from a first software developer, a first user profile data set, with the first user profile data set including information indicative of historical actions taken by first software development in a course of software development work of the first software developer;
receiving a current project data that indicates that the first developer is currently working in an area that deals with a front-end in a model-view-controller framework context and that the first developer has created a stub function block in connection with this current work;
formulating, by a trained machine learning algorithm, a first query based, at least in part on the first user profile data set, with the first query being a query designed to locate a set of application programming interface(s) (API(s)) most suited to implementation of the stub function block;
communicating the first query to an API search engine; and
responsive to communicating the first query to an API search engine, receiving a response data set from the API search engine, with the response data set including a first set of search result(s) that includes information identifying one or more API(s) most suited to the implementation of the stub function block of the first software developer.

2. The CIM of claim 1 wherein the stub function block includes computer code as follows: convert_to_line_chart_based_on_price_history( ){ }.

3. A computer-implemented method (CIM) comprising:
receiving, from a first software developer, a first user profile data set, with the first user profile data set including information indicative of historical actions taken by first software development in a course of the first software developer's software development work;

receiving a programming/accounting data that indicates that an enterprise to which the first developer is currently working uses programming language P and accounting program X;

formulating, by a trained machine learning algorithm, a first query based, at least in part on the first user profile data set, with the first query being a query designed to locate a set of application programming interface(s) (API(s)) most suited to be used with the programming language P and accounting program X;

communicating the first query to an API search engine; and responsive to communicating the first query to an API search engine, receiving a response data set from the API search engine, with the response data set including a first set of search result(s) that includes information identifying one or more API(s) most suited to software development needs of the first software developer while also being compatible with the programming language P and accounting program X.

4. The CIM of claim 3 further comprising:

pulling historical information about activities and technology stack on a first domain.

5. A computer program product (CPP) comprising:

a set of non-transitory storage device(s); and computer code stored collectively in the set of non-transitory storage device(s), with the computer code including data and instructions to cause a processor(s) set to perform at least the following operations:

receiving, from a first software developer, a first user profile data set, with the first user profile data set including information indicative of historical actions taken by first software development in a course of the first software developer's software development work, receiving a current project data that indicates that the first developer is currently working in an area that deals with a front-end in a model-view-controller framework context and that the first developer has created a stub function block in connection with this current work, formulating, by a trained machine learning algorithm, a first query based, at least in part on the first user profile data set, with the first query being a query designed to locate a set of application programming interface(s) (API(s)) most suited to implementation of the stub function block, communicating the first query to an API search engine, and responsive to communicating the first query to an API search engine, receiving a response data set from the API search engine, with the response data set including a first set of search result(s) that includes information identifying one or more API(s) most suited to the implementation of the stub function block of the first software developer.

6. The CPP of claim 5 wherein the stub function block includes computer code as follows: convert_to_line_chart_based_on_price_history( ){ }.

* * * * *